US012637166B1

(12) United States Patent
Tian

(10) Patent No.: US 12,637,166 B1
(45) Date of Patent: May 26, 2026

(54) HANDLEBAR STEM

(71) Applicant: AIMA SPORTS (TIANJIN) CO., LTD, Tianjin (CN)

(72) Inventor: Wei Tian, Tianjin (CN)

(73) Assignee: AIMA SPORTS (TIANJIN) CO., LTD, Tianjin (CN)

( * ) Notice: Subject to any disclaimer, the term of this patent is extended or adjusted under 35 U.S.C. 154(b) by 0 days.

(21) Appl. No.: 19/021,160

(22) Filed: Jan. 15, 2025

(30) Foreign Application Priority Data

Nov. 25, 2024 (CN) .......................... 202422880528.4

(51) Int. Cl.
*B62K 21/12* (2006.01)
(52) U.S. Cl.
CPC .................................... *B62K 21/12* (2013.01)
(58) Field of Classification Search
None
See application file for complete search history.

(56) References Cited

U.S. PATENT DOCUMENTS 6,074,123 A * 6/2000 Osborne ................ B62K 21/12
                                                      403/373
6,955,371 B2 * 10/2005 French ................... B62K 21/18
                                                      280/279
2021/0062841 A1 * 3/2021 Li ........................... F16B 2/065

FOREIGN PATENT DOCUMENTS

FR       2596014 A3 * 9/1987 ............. B62K 21/12

* cited by examiner

*Primary Examiner* — Vicky A Johnson

(57) ABSTRACT

The present disclosure provides a handlebar stem. The handlebar stem provided by the present disclosure includes an annular clamp, a first limiting member, and a first screw. The annular clamp provides an opening, and both sides of the opening are arranged with limiting grooves that communicate with the opening. A length of the limiting groove on a side close to the opening is smaller than a length on the other side. In the present disclosure, the handlebar is locked into the annular clamp by arranging the handlebar into the annular clamp, passing the first screw through a first through hole, and screwing it into a first threaded hole. Two ends of the first limiting member are then arranged into the corresponding limiting grooves, thus enabling the first limiting member to restrict the distance between the two limiting grooves.

8 Claims, 6 Drawing Sheets

HANDLEBAR STEM

CROSS-REFERENCE TO RELATED APPLICATION

The present disclosure claims priority to Chinese Patent Application No. 2024228805284 filed with the Chinese Patent Office on Nov. 25, 2024, entitled "HANDLEBAR STEM", the entire contents of which are incorporated by reference in the present disclosure.

TECHNICAL FIELD

The present disclosure relates to the technical field of electric vehicles, and specifically to a handlebar stem.

BACKGROUND ART

In the prior art, the fork is an important component of a bicycle, configured to lock the front wheel and control the riding direction. For most bicycles, the handlebar is connected to the steerer tube and mounted on the bicycle frame through a handlebar stem.

At present, a handlebar stem includes a connecting member and a first arc plate. One end of the connecting member, away from the spherical clamp, is connected to the steerer tube. The first arc plate and the second arc plate are connected by at least four screws, thereby locking the handlebar between the first arc plate and the second arc plate.

However, as the handlebar is secured solely by screws, the screws are prone to loosening under external forces after prolonged use. This causes the handlebar to slightly move within the handlebar stem, leading to poor stability and safety.

SUMMARY (I) The problem to be solved by the present disclosure is how to reduce the likelihood of movement of the fork and handlebar within the handlebar stem and improve stability and safety. (II) Technical solution A handlebar stem is provided in the present disclosure, including an annular clamp, a first limiting member, and a first screw.

The annular clamp has an opening, and both sides of the opening are arranged with limiting grooves that communicate with the opening.

A length of the two limiting grooves on a side close to the opening is smaller than a length on the other side.

Both ends of the first limiting member are respectively located within the two limiting grooves, and the first limiting member is configured to restrict a distance between the two limiting grooves.

A first through hole and a first threaded hole are respectively arranged on both sides of the opening, and the first screw passes through the first through hole and is screwed into the first threaded hole.

A length direction of the limiting groove is perpendicular to a length direction of the first screw.

According to an embodiment of the present disclosure, the first limiting member includes a first connecting rod and two limiting blocks, and the two limiting blocks are respectively connected to both ends of the first connecting rod.

The two limiting blocks are respectively located within the two limiting grooves. The limiting blocks are slidably connected within the limiting grooves.

According to an embodiment of the present disclosure, the first connecting rod is a screw rod, one end of the screw rod is fixedly connected to one of the limiting blocks, another limiting block is provided with a second threaded hole, and another end of the screw rod is screwed into the second threaded hole.

According to an embodiment of the present disclosure, the handlebar stem further includes a second limiting member, the second limiting member is arranged on one side of the limiting groove, and the second limiting member is configured to prevent the limiting block from detaching from the limiting groove.

According to an embodiment of the present disclosure, the second limiting member includes a baffle plate and a threaded rod; the baffle plate is connected to one end of the threaded rod; a third threaded hole is arranged on a side wall of the annular clamp; and another end of the threaded rod is screwed into the third threaded hole.

According to an embodiment of the present disclosure, the handlebar stem further includes a mounting tube and a second connecting rod, which are connected.

The mounting tube is provided with a tube cavity configured for accommodating a steerer tube, and the second connecting rod is therein provided with a receiving slot communicating with the tube cavity.

An abutment block and a pressing assembly are arranged within the receiving slot, the abutment block is connected to the pressing assembly, and the pressing assembly is configured to adjust a distance of the abutment block to an axis of the mounting tube.

According to an embodiment of the present disclosure, the receiving slot includes a first groove and a second groove that communicate with each other.

The first groove is configured to restrict the abutment block to move only along a first direction, and the first groove is located between the tube cavity and the second groove.

The first direction, a length direction of the annular clamp, and a length direction of the mounting tube are mutually perpendicular.

According to an embodiment of the present disclosure, the pressing assembly includes a first pressing block, a second pressing block, and a second screw.

The second groove is configured to restrict the first pressing block and the second pressing block to move only along a direction perpendicular to the first direction.

The abutment block is a tapered block, and a sectional area of a side of the tapered block away from an axis of the mounting tube is smaller than a sectional area of another side.

The tapered block is provided with a first side wall and a second side wall opposite to each other, the first pressing block abuts the first side wall, and the second pressing block abuts the second side wall.

The first pressing block is provided with a second through hole, the tapered block is provided with a third through hole, and the second screw sequentially passes through the second through hole and the third through hole and is then screwed into the second pressing block.

According to an embodiment of the present disclosure, the limiting block is provided with a fifth threaded hole.

According to an embodiment of the present disclosure, the first through hole is provided with a first counterbore at an end away from the first threaded hole.

The beneficial effects of the present disclosure are as follows.

The handlebar is locked into the annular clamp by arranging the handlebar into the annular clamp, passing the first screw through a first through hole, and screwing it into a first threaded hole, where the distance between the two limiting grooves is reduced during the locking process of the annular clamp in cooperation with the first screw. Two ends of the first limiting member are then arranged into the corresponding limiting grooves, thus enabling the first limiting member to restrict the distance between the two limiting grooves, that is, the limitation of the opening. Even if the first nut loosens after prolonged use, the distance between the two limiting grooves does not increase, thereby reducing the likelihood of slight movement of the handlebar within the handlebar stem and improving stability and safety.

BRIEF DESCRIPTION OF DRAWINGS

In order to more clearly illustrate the specific embodiments of the present disclosure or the technical solution in the prior art, the drawings required to be used in the description of the specific embodiment or prior art will be briefly introduced as follows. Obviously, the drawings described below are some embodiments of the present disclosure, for those of ordinary skill in the art, without paying inventive effort, may also obtain other drawings according to these drawings.

Figure 1:
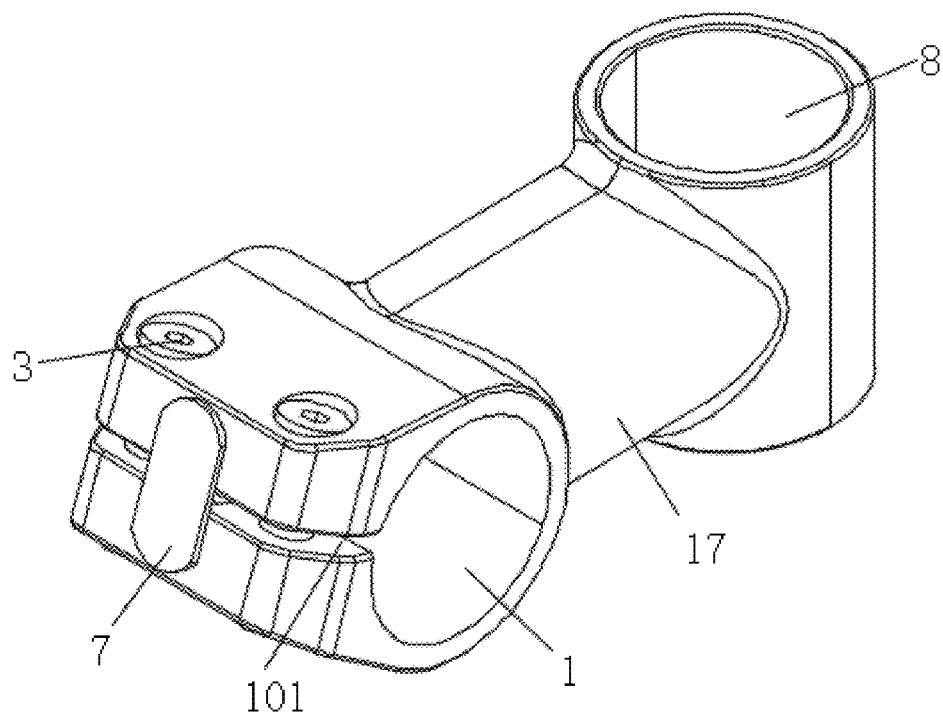
FIG. 1 is a first perspective schematic diagram of a handlebar stem provided in the embodiment of the present disclosure.
Figure 2:
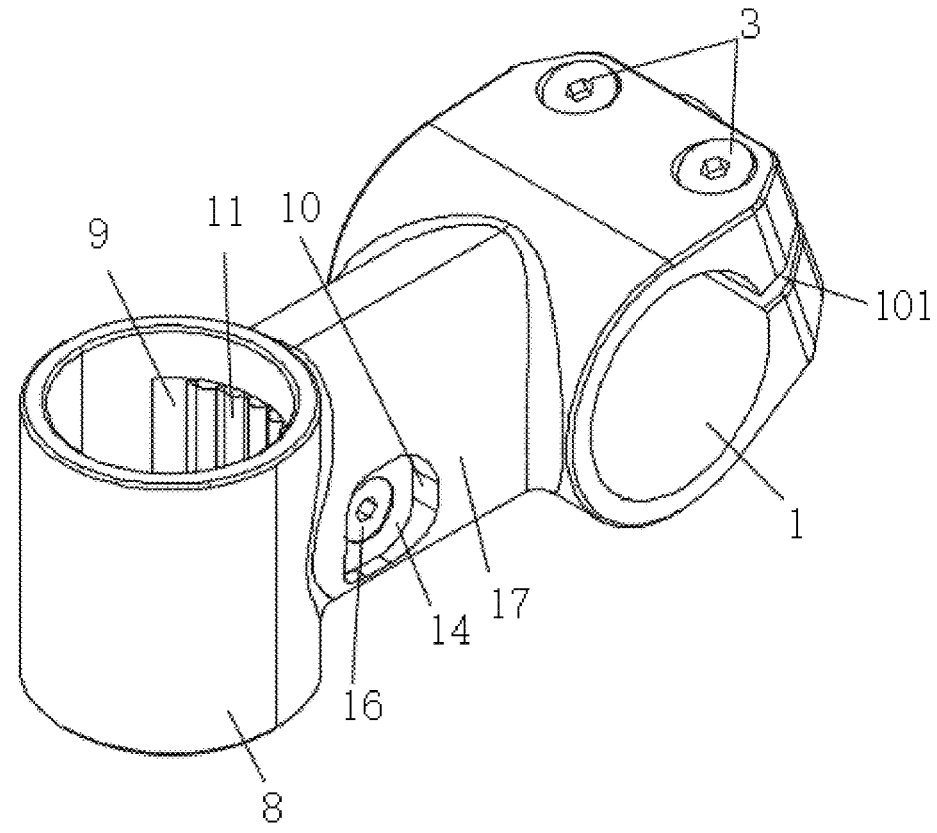
FIG. 2 is a second perspective schematic diagram of a handlebar stem provided in the embodiment of the present disclosure.
Figure 3:
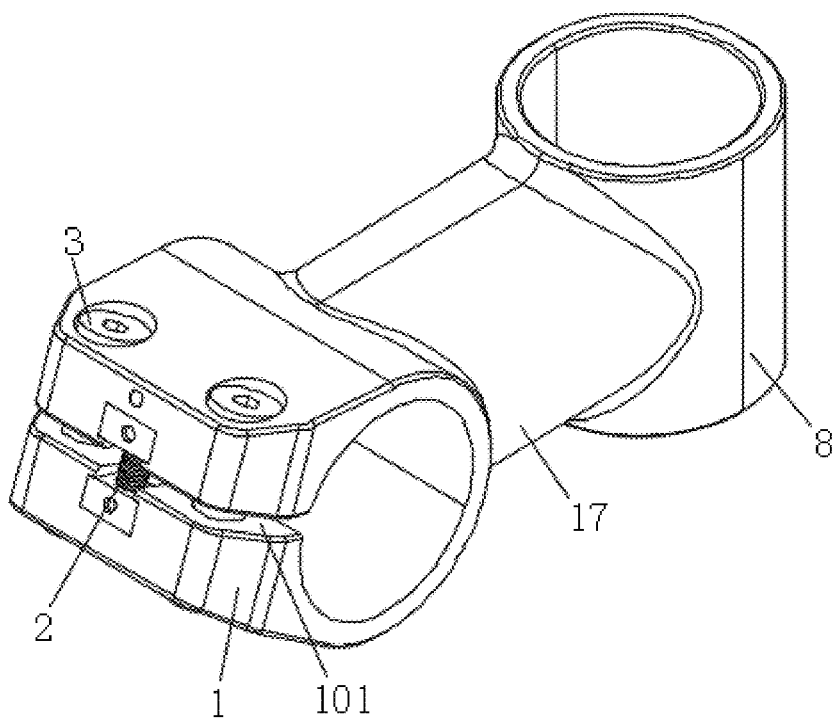
FIG. 3 is a perspective diagram of a handlebar stem with a second limiting member removed, provided in the embodiment of the present disclosure.
Figure 4:
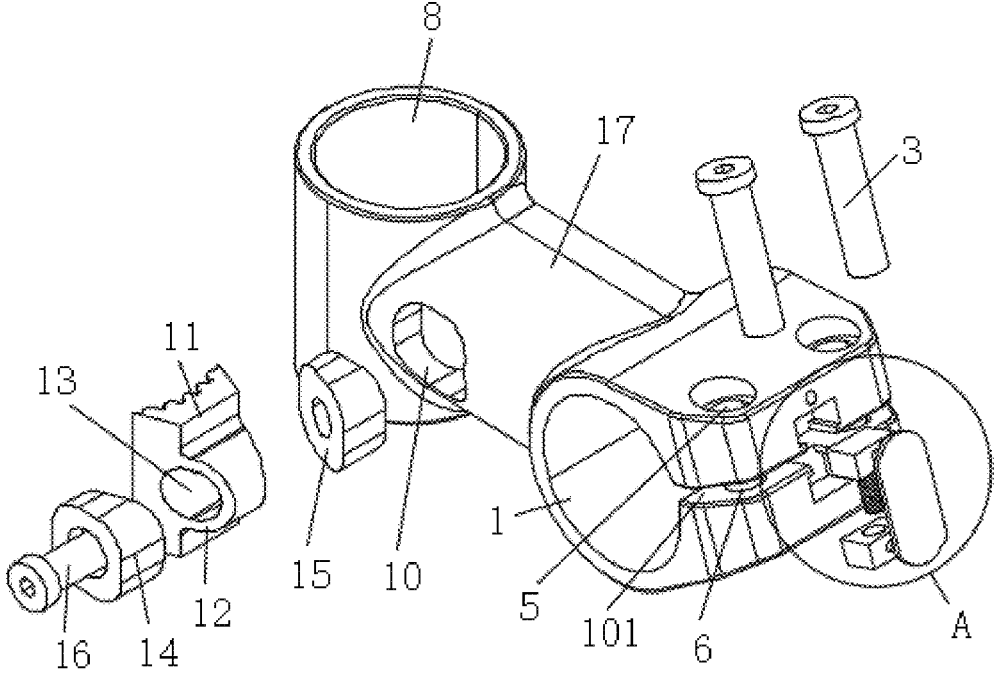
FIG. 4 is a first perspective exploded schematic diagram of a handlebar stem provided in the embodiment of the present disclosure.
Figure 5:
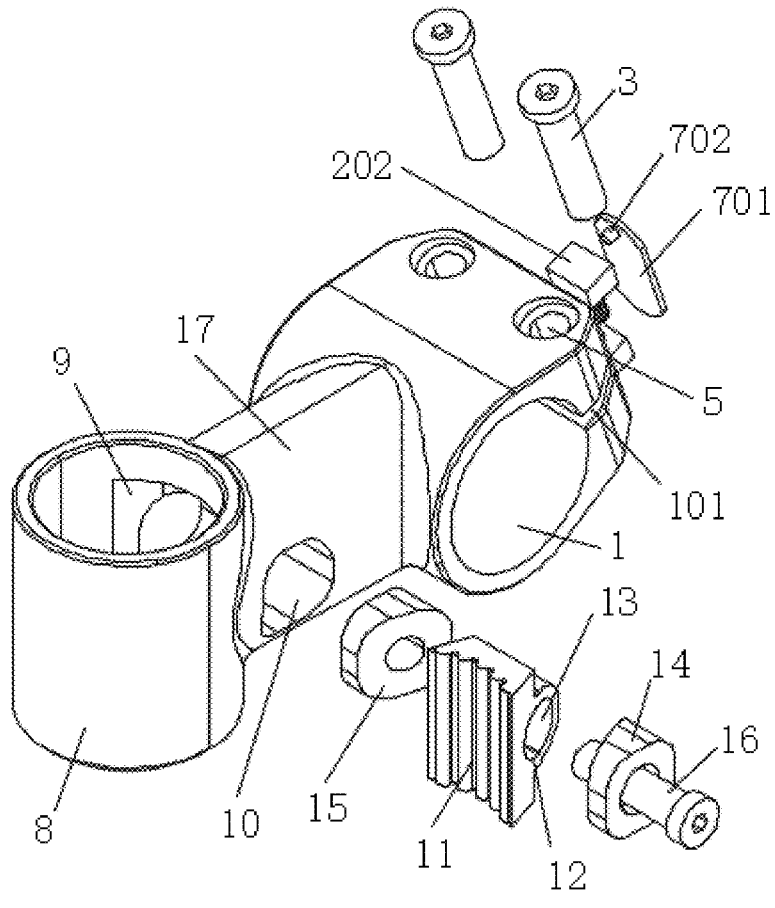
FIG. 5 is a second perspective exploded schematic diagram of a handlebar stem provided in the embodiment of the present disclosure.
Figure 6:
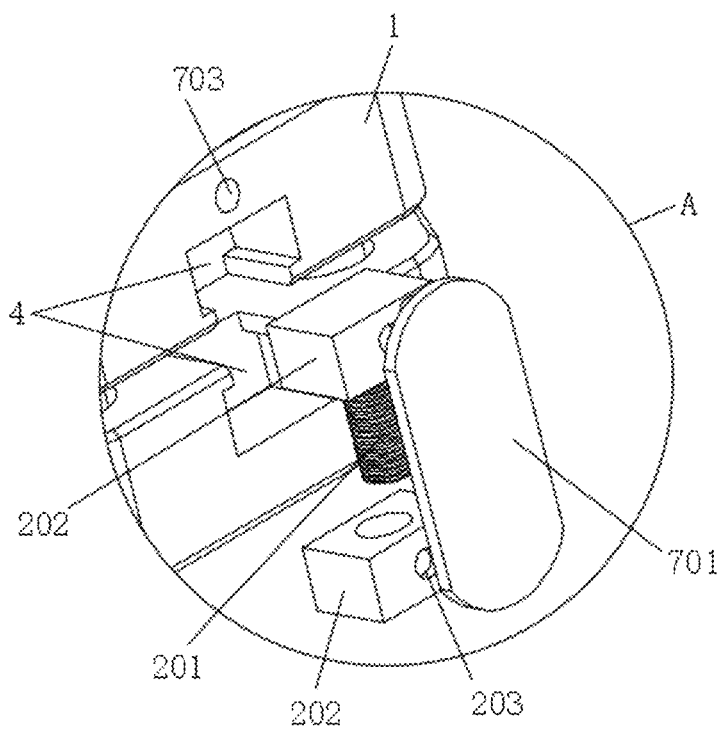
FIG. 6 is an enlarged diagram of portion A in FIG. 4 provided in the embodiment of the present disclosure.

Reference numerals: 1—annular clamp; 101—opening; 2—first limiting member; 201—first connecting rod; 202—limiting block; 203—fifth threaded hole; 3—first screw; 4—limiting groove; 5—first through hole; 6—first threaded hole; 7—second limiting member; 701—baffle plate; 702—threaded rod; 703—third threaded hole; 8—mounting tube; 9—first groove; 10—second groove; 11—abutment block; 12—first side wall; 13—third through hole; 14—first pressing block; 15—second pressing block; 16—second screw; 17—second connecting rod.

DETAILED DESCRIPTION OF EMBODIMENTS

The technical solutions of the present disclosure will be clearly and completely described below in connection with the embodiments. Obviously, the described embodiments are a part of the embodiments of the present disclosure and not all of the embodiments. Based on the embodiments in the present disclosure, all other embodiments obtained by those of ordinary skill in the art without making inventive efforts are within the scope of protection of the present disclosure.

As shown in FIGS. 1 to 7, an embodiment of the present disclosure provides a handlebar stem, including an annular clamp 1, a first limiting member 2, and a first screw 3.

The annular clamp 1 has an opening 101, and both sides of the opening 101 are arranged with limiting grooves 4 that communicate with the opening 101.

A length of the two limiting grooves 4 on a side close to the opening 101 is smaller than a length on the other side.

Both ends of the first limiting member 2 are respectively located within the two limiting grooves 4, and the first limiting member 2 is configured to restrict a distance between the two limiting grooves 4.

A first through hole 5 and a first threaded hole 6 are respectively arranged on both sides of the opening 101, and the first screw 3 passes through the first through hole 5 and is screwed into the first threaded hole 6.

A length direction of the limiting groove 4 is perpendicular to a length direction of the first screw 3.

The handlebar is locked into the annular clamp 1 by arranging the handlebar into the annular clamp 1, passing the first screw 3 through a first through hole 5, and screwing it into a first threaded hole 6, where the distance between the two limiting grooves 4 is reduced during the locking process of the annular clamp 1 in cooperation with the first screw 3. Two ends of the first limiting member 2 are then arranged into the corresponding limiting grooves 4, thus enabling the first limiting member 2 to restrict the distance between the two limiting grooves 4, that is, the limitation of the opening 101. Even if the first nut loosens after prolonged use, the distance between the two limiting grooves 4 does not increase, thereby reducing the likelihood of slight movement of the handlebar within the handlebar stem and improving stability and safety.

The annular clamp 1 can be made of an aluminum alloy material, providing certain elasticity and strength to securely lock the handlebar under the action of the first screw 3. The annular clamp 1 is provided with a through cavity connected to the opening 101, and the handlebar is positioned within the through cavity.

In the embodiment, the length direction of the limiting groove 4 is the same as the length direction of the annular clamp 1. The limiting groove 4 is a T-shaped groove.

The annular clamp 1 used in the embodiment only needs to be locked by two first screws 3 during actual use, allowing for higher installation efficiency, greater convenience, and reduced costs.

According to an embodiment of the present disclosure, the first limiting member 2 comprises a first connecting rod 201 and two limiting blocks 202, and the two limiting blocks 202 are respectively connected to both ends of the first connecting rod 201.

The two limiting blocks 202 are respectively located within the two limiting grooves 4.

The limiting blocks 202 are slidably connected within the limiting grooves 4.

The limiting block 202 can slide along the width direction of the limiting groove 4.

According to an embodiment of the present disclosure, the first connecting rod 201 is a screw rod, one end of the screw rod is fixedly connected to one of the limiting blocks 202, another limiting block 202 is provided with a second threaded hole, and another end of the screw rod is screwed into the second threaded hole.

The worker holds one limiting block 202 in each hand and twists the two limiting blocks 202 in opposite directions, causing the screw rod to rotate and move within the second threaded hole to adjust the distance between the two limiting blocks 202. Once an appropriate distance is achieved (after each adjustment is completed, the length directions of the two limiting blocks 202 are the same), the two limiting blocks 202 are inserted into the corresponding limiting grooves 4 of the annular clamp 1, which has already been secured by the first screw 3, thus achieving secondary limiting.

The first limiting member 2 is arranged as an adjustable limiting structure, so that it has a wider application scope and is applicable to the locking of handles of different sizes, thus enhancing its practicality. Since the limiting block 202 is slidingly connected to the limiting groove 4, the limiting block 202 can only slide along the length direction of the limiting groove 4 and cannot rotate within the limiting groove 4. Therefore, when the two limiting blocks 202 are located in the corresponding limiting grooves 4, their distance will not change, ensuring stability during use.

Of course, in the embodiment, the two ends of the first connecting rod 201 are fixedly connected to the two limiting blocks 202, and the two limiting blocks 202 are respectively located in the two limiting grooves 4. Therefore, the distance between the two limiting grooves 4 cannot be altered. The principle does not deviate from the design concept of the present disclosure and should therefore fall within the protection scope of the present disclosure.

According to an embodiment of the present disclosure, the handlebar stem further includes a second limiting member 7, the second limiting member 7 is arranged on one side of the limiting groove 4, and the second limiting member 7 is configured to prevent the limiting block 202 from detaching from the limiting groove 4.

According to an embodiment of the present disclosure, the second limiting member 7 includes a baffle plate 701 and a threaded rod 702, the baffle plate 701 is connected to one end of the threaded rod 702, a third threaded hole 703 is arranged on a side wall of the annular clamp 1, and another end of the threaded rod 702 is screwed into the third threaded hole 703.

Since the limiting block 202 is slidingly connected to the limiting groove 4, when the first screw 3 has not loosened, the limiting block 202 can slide out of the limiting groove 4. To prevent this phenomenon, a baffle plate 701 is provided to cover the limiting groove 4. The threaded rod 702 is screwed into the third threaded hole 703 of the annular clamp 1, making it easy to remove or rotate the baffle plate 701 to other positions, so that it cannot cover the limiting groove 4. This facilitates the quick removal or mounting of the handlebar from the handlebar stem, thus improving work efficiency.

According to an embodiment of the present disclosure, the limiting block 202 is provided with a fifth threaded hole 203. By screwing a bolt or other tool into the fifth threaded hole 203, the first limiting member 2 can be easily pulled out of the limiting groove 4, making it easy to disassemble and assemble the annular clamp 1 and the handle.

According to an embodiment of the present disclosure, the handlebar stem further comprises a mounting tube 8 and a second connecting rod 17, which are connected.

The mounting tube 8 is provided with a tube cavity configured for accommodating a steerer tube, and the second connecting rod 17 is therein provided with a receiving slot communicating with the tube cavity.

An abutment block 11 and a pressing assembly are arranged within the receiving slot, the abutment block 11 is connected to the pressing assembly, and the pressing assembly is configured to adjust a distance of the abutment block 11 to an axis of the mounting tube 8.

In traditional handlebar stems, the connecting member includes a rod body and a clamp, with one end of the rod body connected to the clamp and the other end connected to the spherical clamp. The opening of the clamp is locked and fixed by screws to fix the steerer tube to the handlebar stem. However, this method also has the issue of screws loosening, which can cause the clamp of the handlebar stem within the steerer tube to wobble.

In the embodiment, the abutment block 11 and the pressing assembly are provided, and the pressing assembly adjusts the distance of the abutment block 11 to an axis of the mounting tube 8. This replaces the traditional screw-only fixation method and provides better performance, and the abutting region is less prone to loosening.

According to an embodiment of the present disclosure, the receiving slot includes a first groove 9 and a second groove 10 that communicate with each other.

The first groove 9 is configured to restrict the abutment block 11 to move only along a first direction, and the first groove 9 is located between the tube cavity and the second groove 10.

The first direction, a length direction of the annular clamp 1, and a length direction of the mounting tube 8 are mutually perpendicular.

Figure 7:
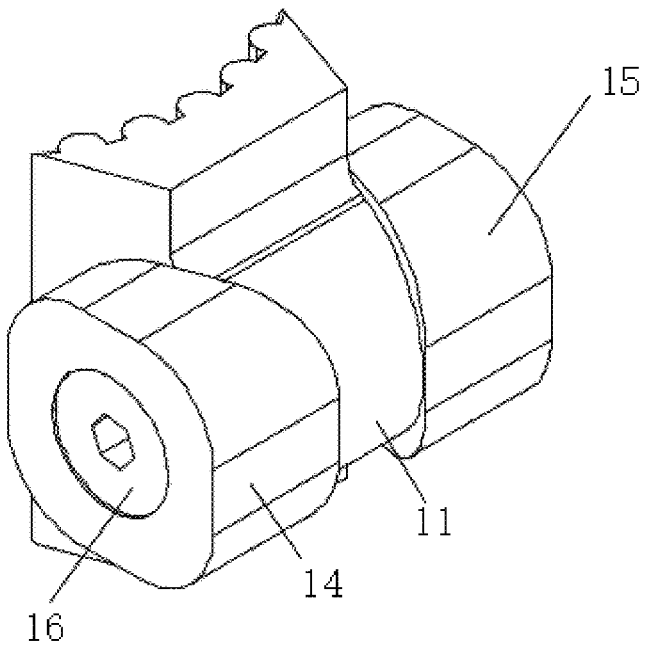
FIG. 7 is a perspective diagram of a pressing assembly and an abutment block provided in the embodiment of the present disclosure.

According to an embodiment of the present disclosure, as shown in FIG. 7, the pressing assembly comprises a first pressing block 14, a second pressing block 15, and a second screw 16.

The second groove 10 is configured to restrict the first pressing block 14 and the second pressing block 15 to move only along a direction perpendicular to the first direction.

The abutment block 11 is a tapered block, and a sectional area of a side of the tapered block away from an axis of the mounting tube 8 is smaller than a sectional area of another side.

The tapered block is provided with a first side wall 12 and a second side wall opposite to each other, the first pressing block 14 abuts the first side wall 12, and the second pressing block 15 abuts the second side wall.

The first pressing block 14 is provided with a second through hole, the tapered block is provided with a third through hole 13, and the second screw 16 sequentially passes through the second through hole and the third through hole 13 and is then screwed into the second pressing block 15.

In the embodiment, the first direction is perpendicular to the axis direction of the mounting tube 8, and the first direction is perpendicular to the length direction of the annular clamp 1.

The length direction of the mounting tube 8, the length direction of the annular clamp 1, and the length direction of the second connecting rod 17 are mutually perpendicular. The second connecting rod 17 is connected to the annular clamp 1. The first direction is the same as the length direction of the second connecting rod 17.

The size of the third through hole 13 is larger than the size of the second screw 16, allowing the abutment block 11 to move.

The abutment block 11 is provided with an abutting portion, and the abutting portion is configured to abut the side wall of the steerer tube. The abutting portion is arranged with multiple arcuate strip blocks at intervals, which can increase the friction at the contact position with the steerer tube, thereby improving stability.

First, the second pressing block 15 is placed into the second groove 10. Then, the abutment block 11 passes through the pipe cavity to enter a specified position. The abutment block 11 is moved along the first direction so that the third through hole 13 of the abutment block 11 enters the second groove 10. Next, the first pressing block 14 is placed into the second groove 10. The second screw 16 passes through the second through hole and the third through hole 13 in sequence and is screwed to the second pressing block 15. Since the second pressing block 15 is limited by the second recess 10, it can only slide along the first direction. Therefore, when the second screw 16 is tightened, the second pressing block 15 moves toward the first pressing block 14 under the dual action of the second screw 16 and the second groove 10. Driven by the second screw 16, the first pressing block 14 moves towards the second pressing block 15. As shown in FIG. 7, since the abutment block 11 is a tapered block arranged with the first side wall 12 and the second side wall opposite to each other, the first pressing block 14 and the second pressing block 15 are in contact with the first side wall 12 and the second side wall, respectively. When the first pressing block 14 and the second pressing block 15 come closer to each other, the abutment block 11 gradually moves along the direction toward the axis of the mounting tube 8 and tightly abuts the side wall of the steerer tube inserted into the mounting tube 8, thus improving its fixation effect.

According to an embodiment of the present disclosure, the first through hole 5 is provided with a first counterbore at an end away from the first threaded hole 6. The first counterbore arranged can accommodate the head of the first screw 3, enhancing the aesthetic appearance. The head of the first screw 3 is not easy to scratch the user, thus improving safety.

In the description of the present disclosure, it should be noted that the terms "top", "bottom", etc. indicate an orientation or positional relationship based on the orientation or positional relationship shown in the accompanying drawings and are intended only to facilitate and simplify the description of the present disclosure, not to indicate or imply that the device or element referred to must have a particular orientation, be constructed and operate in a particular orientation, and therefore are not to be construed as limiting the present disclosure. In addition, the terms "first" and "second" are used for descriptive purposes only and are not to be construed as indicating or implying relative importance.

In the description of the present disclosure, it should also be noted that unless otherwise clearly stipulated and limited, the terms "mount", "communicate", and "connect" should be understood in a broad sense. For example, it can be a fixed connection, a detachable connection, or an integral connection; it can be a mechanical connection or an electrical connection; and it can be a direct communication, an indirect communication through an intermediary, or an internal communication between two components. Those of ordinary skill in the art can understand the meanings of the above terms in the present disclosure according to specific situations. In the description of the present disclosure, unless otherwise indicated, the term "multiple" means two or more.

The above is merely a preferred embodiment of the present disclosure and is not intended to limit the present disclosure. Any modifications, equivalent substitutions, or improvements made within the spirit and principles of the present disclosure should be included within the scope of protection of the present disclosure.

What is claimed is:

1. A handlebar stem, comprising an annular clamp, a first limiting member, and a first screw, wherein the annular clamp has an opening, and both sides of the opening are arranged with limiting grooves that communicate with the opening;

a length of the two limiting grooves on a side close to the opening is smaller than a length on the other side;

both ends of the first limiting member are respectively located within the two limiting grooves, and the first limiting member is configured to restrict a distance between the two limiting grooves;

a first through hole and a first threaded hole are respectively arranged on both sides of the opening, and the first screw passes through the first through hole and is screwed into the first threaded hole; and a length direction of the limiting grooves is perpendicular to a length direction of the first screw, wherein the first limiting member comprises a first connecting rod and two limiting blocks, and the two limiting blocks are respectively connected to both ends of the first connecting rod;

the two limiting blocks are respectively located within the two limiting grooves; and the limiting blocks are slidably connected within the limiting grooves, wherein the first connecting rod is a screw rod, one end of the screw rod is fixedly connected to one of the limiting blocks, another limiting block is provided with a second threaded hole, and another end of the screw rod is screwed into the second threaded hole.

2. The handlebar stem according to claim 1, wherein the handlebar stem further comprises a second limiting member, the second limiting member is arranged on one side of the limiting groove, and the second limiting member is configured to prevent the limiting block from detaching from the limiting groove.

3. The handlebar stem according to claim 2, wherein the second limiting member comprises a baffle plate and a threaded rod, the baffle plate is connected to one end of the threaded rod, a third threaded hole is arranged on a side wall of the annular clamp, and another end of the threaded rod is screwed into the third threaded hole.

4. The handlebar stem according to claim 1, wherein the handlebar stem further comprises a mounting tube and a second connecting rod, which are connected;

the mounting tube is provided with a tube cavity configured for accommodating a steerer tube, and the second connecting rod is therein provided with a receiving slot communicating with the tube cavity; and an abutment block and a pressing assembly are arranged within the receiving slot, the abutment block is connected to the pressing assembly, and the pressing assembly is configured to adjust a distance of the abutment block to an axis of the mounting tube.

5. The handlebar stem according to claim 4, wherein the receiving slot comprises a first groove and a second groove that communicate with each other;

the first groove is configured to restrict the abutment block to move only along a first direction, and the first groove is located between the tube cavity and the second groove; and the first direction, a length direction of the annular clamp, and a length direction of the mounting tube are mutually perpendicular.

6. The handlebar stem according to claim 5, wherein the pressing assembly comprises a first pressing block, a second pressing block, and a second screw;

the second groove is configured to restrict the first pressing block and the second pressing block to move only along a direction perpendicular to the first direction;

the abutment block is a tapered block, and a sectional area of a side of the tapered block away from an axis of the mounting tube is smaller than a sectional area of another side;

the tapered block is provided with a first side wall and a second side wall opposite to each other, the first pressing block abuts the first side wall, and the second pressing block abuts the second side wall; and the first pressing block is provided with a second through hole, the tapered block is provided with a third through hole, and the second screw sequentially passes through the second through hole and the third through hole and is then screwed into the second pressing block.

7. The handlebar stem according to claim 1, wherein the limiting block is provided with a fifth threaded hole.

8. The handlebar stem according to claim 1, wherein the first through hole is provided with a first counterbore at an end away from the first threaded hole.

\* \* \* \* \*